(12) United States Patent  (10) Patent No.: US 8,061,323 B2
Konzelmann et al.  (45) Date of Patent: Nov. 22, 2011

(54) FLOW GUIDE ELEMENT FOR GUIDING THE FLOW OF A FLUID MEDIUM

(75) Inventors: Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 12/152,494

(22) Filed: May 14, 2008

(65) Prior Publication Data

US 2008/0283014 A1 Nov. 20, 2008

(30) Foreign Application Priority Data

May 16, 2007 (DE) .......................... 10 2007 023 119

(51) Int. Cl.
  *F02M 35/10* (2006.01)
(52) U.S. Cl. ................................................ 123/184.21
(58) Field of Classification Search ............. 123/184.21, 123/518, 41.61, 41.69, 41.56, 41.58–41.62; 137/171, 561 A, 599.11; 73/204.18, 198, 73/861, 114.32, 114.34; 702/100; 29/852
See application file for complete search history.

(56) References Cited

U.S. PATENT DOCUMENTS

| 1,377,381 | A | * | 5/1921 | Worrall ........................... 96/349 |
| 3,254,475 | A | * | 6/1966 | Farr et al. ........................ 96/232 |
| 6,065,486 | A | * | 5/2000 | Vetterick et al. ............... 137/171 |
| 6,668,663 | B2 | * | 12/2003 | May et al. .................. 73/861.05 |
| 7,162,920 | B2 | * | 1/2007 | Konzelmann et al. ....... 73/202.5 |

FOREIGN PATENT DOCUMENTS

DE 102 53 970 6/2004

* cited by examiner

*Primary Examiner* — Michael Cuff
*Assistant Examiner* — Keith Coleman
(74) *Attorney, Agent, or Firm* — Kenyon & Kenyon LLP

(57) ABSTRACT

A flow guide element is provided for guiding a flow of a fluid medium which is particularly suitable for use in an intake tract of an internal combustion engine. The flow guide element includes a flow tube having an elbow for diverting the flow. In the region of the elbow there is situated, in this case, at least one flow baffle having at least one deflector. The deflector is penetrated by an opening, going right through the flow baffle, in at least one area.

14 Claims, 3 Drawing Sheets

United States Patent US 8,061,323 B2

FLOW GUIDE ELEMENT FOR GUIDING THE FLOW OF A FLUID MEDIUM

BACKGROUND INFORMATION

The present invention relates to flow guide elements such as the ones used in various fields of natural science and technology. These flow guide elements are used as a part of flow guide systems which are used to guide flowing fluid media, especially gases or liquids over a specified path, for instance, to supply gases to a process or drain off exhaust gases from this process.

One important field of application of a flow guide is motor vehicle technology, and within that field, especially the area of guiding gaseous media. A first important example in the field of motor vehicle technology is the area of air guidance in connection with air filters in the intake tract of internal combustion engines. The air taken in, in this instance, has to be guided from the air filter to the internal combustion engine by using several partially straight, partially curved pieces of tubing.

A second example, in which flow guide elements are important, is air mass meters such as may also be used in the intake tract of internal combustion engine, for example. One important measuring principle is the so-called hot-film air mass meter, like the one described in German Patent Application No. DE 102 53 970, for example. In such devices, which may be inserted as plug-in sensors into the intake tract, for example, a part of the air is guided through a so-called bypass channel, which is curved several times, to a sensor chip on which the air mass throughput may be determined, using heating elements and temperature sensors. German Patent Application No. DE 102 53 970, for instance, describes the method of functioning of such hot-film air mass meters.

Depending on the field of application, such flow guide elements or systems, which are composed of these elements, are subject to various requirements. Thus, in the intake tract, especially in the area of the air filters, besides an intake air quantity that is stable in time and as free from fluctuations as possible, a high air throughput is of decisive importance. In other systems, by contrast, such as the hot-film air mass meters mentioned, the emphasis of requirements (besides as high a throughput as possible, which is subject to a signal level swing) is especially on high stability of the flow of the fluid medium.

In order to do justice to these requirements, even today, in many flow systems, especially in air flow systems, guide blades are used in order to divert the flow in as lossfree a manner as possible, and without flow separation. Such guide blades are used under various designations, and are also designated as auxiliary wings or sheet metal diverters.

One example of such guide blades is described in German Patent Application No. DE 102 53 970. In the system described there, in order to improve the flow conditions in the bypass channel of the hot-film air mass meter, a guide blade is proposed (there designated by reference numeral 50), which guides the flow and counteracts flow separation of the flow of the partial media flow from the channel walls of the measuring channel. Other examples may be found in the constructions of many current motor vehicle air filters.

An important disadvantage of this design approach is that the geometry and the position of the guide blades has to be adapted very carefully to be effective. Unfortunately, this constructive adaptation is not always possible, since the flow topology in air guidance systems frequently changes rapidly with flow speed. In this case it may happen that the guide blades or sheet metal baffles themselves cause additional separations and interferences.

SUMMARY OF THE INVENTION

A flow guide element to guide the flow of a fluid medium is therefore provided, which substantially avoids the disadvantages of known flow guide elements described above. The flow guide element is particularly suitable for use in the intake tract of an internal combustion engine, but may also be used for other types of flow guide elements in the fields of natural science and technology, especially in the field of method technology and/or automobile construction.

The flow guide element provided includes a flow tube (by analogy, however, several flow tubes being able to be included too), having an elbow for diverting the flow. By "elbow" one should basically understand, in this context, any formed element which is designed to change the main flow direction of the fluid medium. The flow tube may basically also have any cross section, round cross sections and/or multiangular cross sections being preferred for construction reasons, however.

In the region of the elbow, in this instance, there is situated at least one flow baffle having at least one deflector. Thus, "flow baffles" are to be taken as being elements basically formed at will, which are situated in the flow, that is, within the flow cross section of the flow tube, and which are designed by their deflectors to favor the diversion of the flow.

To this extent, the provided flow guide element corresponds, for instance, to the guide blades in the bypass of an hot-film air mass meter described in German Patent Application No. DE 102 53 970, that was described above. By contrast to known flow guide elements, the flow guide element provided is, however, designed in such a way that the deflector has an opening in at least one area that passes through the flow baffle.

By "opening" one should understand an opening which passes transversely through the flow guide element, in this context. It is particularly preferred if this opening is situated approximately perpendicular to the local flow direction of the fluid medium, preferably having a deviation from a right angle of not more than 20°.

A basic idea of the flow guide element provided using the openings is to avoid flow separations in the areas of the flow baffle by the deliberate introduction of longitudinal swirls. By longitudinal swirl one should understand a swirl having a swirl axis which is directed essentially in the main flow direction (or rather in the local main flow direction of the fluid medium.

Because of pressure differences, the air, or rather the fluid medium flows through between the leading edge (also called the luff side, below) and the side facing away from the flow (also called the lee side below), and generates strong longitudinal swirls on the lee side. These longitudinal swirls ensure a reinforced pulse exchange between rapid fluid (external current) and slow fluid (fluid in the separation area), and in this way diminish or avoid separations at the rear side of the flow baffle.

Because of the at least partial permeability of the flow baffle, a "soft" effect is ensured. The diverting effect may be weakened locally by partial perforation. Because of this, the flow baffle becomes relatively insensitive to its positioning and its geometry. Because of the pressure drop of the flow through the flow baffles or the guide blades with increasing flow speed, the diverting action increases with increasing flow speed. This effect correlates with the physical fact that the separation tendency generally decreases with increasing flow speed and increasing Reynolds number.

In this context it is particularly preferred if the flow baffle includes a sheet metal flow baffle. However, the term "sheet metal" should not necessarily be limited to mean a metallic material, although metals and sheet metals are preferably used. In particular, perforated sheet metals that are commercially available may be used in this context.

In particular, the sheet metal baffle may have a rectangular shape, for instance, having a first rectangular side, which essentially corresponds to a diameter and/or a chord of the flow tube, and a second side, the longitudinal side, which corresponds to the longitudinal extension of the sheet metal guide in the flow tube.

In this context, the thickness of the sheet metal baffle is preferably constant and it is preferably smaller by an order of magnitude than the extension of the sheet metal guide in the lateral direction.

Instead of sheet metal baffles having constant thickness, which are preferably made of a deformable material, other types of flow baffles may also be used, such as guide blades, guide wings or similar shapes, as described above, for instance, having a wing cross section.

The opening preferably has a round shape, in particular a circular or oval shape, and/or a multiangular shape, especially a rectangular shape and/or a slotted shape.

A plurality of openings may be situated in a matrix shape, in this instance, a matrix being understood to be a uniform geometrical positioning in a plane. However, this does not have to be a row and column arrangement, but every other row may be offset by half a column width compared to the remaining rows, for instance.

The "density" of the distribution of the openings may also be designed to be variable, and may vary, for instance, corresponding to the pressure conditions at the deflector. One example which implements this idea in a simple way is that the flow baffle includes at least one first area provided with openings, and at least one second area not provided with openings.

DETAILED DESCRIPTION

Figure 1A:
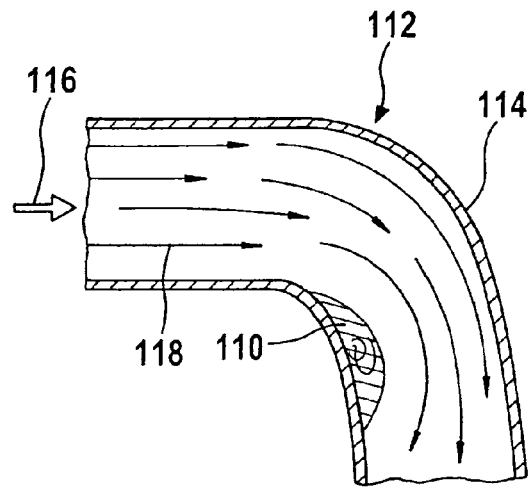
FIG. 1A shows the problem of the formation of separation regions in the area of elbows.
Figure 1B:
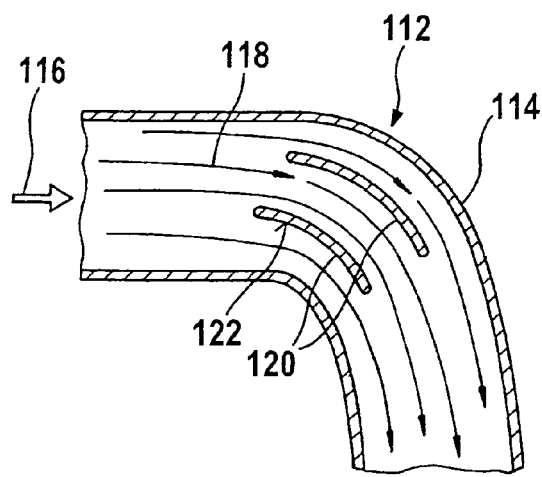
FIG. 1B shows the reduction of the problem by the use of sheet metal baffles.

In FIGS. 1A and 1B, the known problem of the formation of separation regions 110 is shown in the region of elbows 112 of flow tubes 114. The fluid medium, in this instance, flows at a (local) main flow direction 116 through flow tube 114. Directly after being diverted in the region of elbow 112, there is formed a separation region 110, in the embodiment in FIG. 1A not having flow baffles, in which a very slow flow and a partial backflow prevail.

In this region, the flow, which is symbolically made clear in FIGS. 1A and 1B by flow lines 118, is compressed, and the flow cross section becomes narrower. The throughput of flowing fluid medium through flow tube 114 is reduced thereby. An additional problem is that separation regions 110 may be unstable laterally, whereby fluctuations in the throughput may occur.

FIG. 1B shows the arrangement shown in FIG. 1A, but in this case two flow sheet metal baffle 120 have been accommodated inside flow tube 114. These flow sheet metal baffles 120 have deflectors 122. As may be seen in the stylized representation in FIG. 1B, these sheet metal baffles 120 contribute the formation of separation region 110 being at least largely avoided.

Figure 2A:
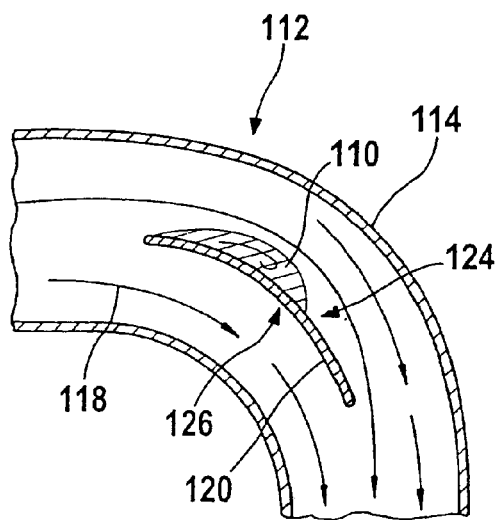
FIG. 2A shows the problem of the formation of separation regions to the lee of sheet metal baffles.

However, in FIG. 2A a problem is shown that is frequently observed in practice. On leeward side 124 of flow sheet metal baffle 120, in this case, there is formed a separation region 110. Consequently, sheet metal baffle 120 does not directly contribute to the solution of the problem, described above, of the formation of separation regions 110, but it may, under unfavorable flow conditions, even augment the problem, or solve it only partially.

Figure 2B:
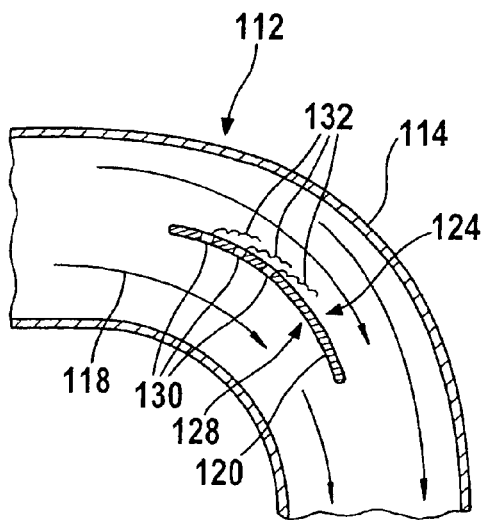
FIG. 2B shows the avoidance of this problem by the use of perforated sheet metal baffles, according to the present invention.

By contrast, in FIG. 2B an embodiment according to the present invention of a flow sheet metal baffle 120 is shown. In this case, flow sheet metal baffle 120 has several openings 130 at its upstream end. Because of the pressure differences between luff side 128 and lee side 124 of flow sheet metal baffle 120, longitudinal swirls 132 form on the leeward side behind these openings 130. These longitudinal swirls 132 ensure a thorough mixing of the flow on leeward side 124 of guide blade 120 and thus they prevent the formation of separation region 110.

Instead of only one flow sheet metal baffle 120, as shown in FIG. 2B, exemplary embodiments are also possible, however, in which several such flow sheet metal guides 120 may be inserted. As a result, the exemplary embodiment shown in FIG. 1B may also be modified in such a way that both flow sheet metal baffles 120 have such openings 130.

Figure 3:
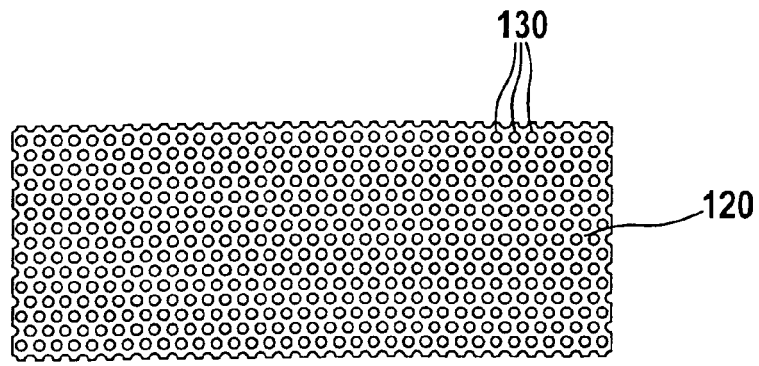
FIG. 3 shows one exemplary embodiment of a continuously perforated sheet metal for use as a sheet metal baffle.

In FIGS. 3 to 5C, various exemplary embodiments of flow sheet metal baffles 120 are shown having openings 130, such as may be used in air filters (see below). Thus, FIG. 3 shows a top view of a sheet metal guide 120 that is completely interspersed with openings 130. Sheet metal baffle 120 is thus designed in this exemplary embodiment completely as a perforated sheet metal, which may be made of aluminum, for example.

Openings 130 are circular in this exemplary embodiment, and are situated in a matrix type, every other row being offset by one-half of a column distance. The sheet metal may have a thickness of 0.7 mm, for example, and the holes may have a diameter of 1 mm, and the sheet metal preferably has a rectangular shape having an edge length of 20 to 25 mm and a length of ca. 80 mm. The exact measurements of holes 130 usually depend strongly on the installation situation.

Figure 4:
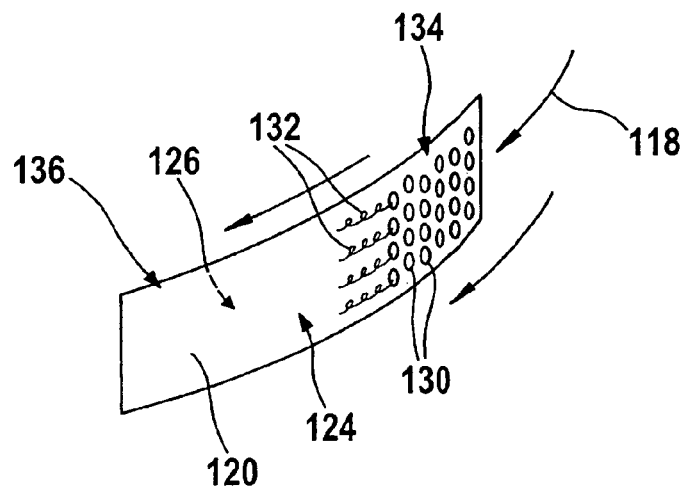
FIG. 4 shows a stylized, perspective representation of the swirl formation at a partially perforated sheet metal baffle.

In a perspective representation, FIG. 4 shows the flow against a sheet metal baffle 120. We have selected the view direction onto leeward side 124 of sheet metal baffle 120.

By contrast to the embodiment in FIG. 3, flow sheet metal baffle 120, in the representation according to FIG. 4, has a first area 134 that is provided with openings 130, as well as a second area 136 in which no openings 130 are situated. Sheet metal baffle 120, in this context, is differently curved along its longitudinal extension, and has the greatest curvature in first area 134. This example in FIG. 4 is an example to show that the distribution and the density of openings 130 is able to be optimized, so as to achieve an optimum flow guide effect, on the one hand, and effectively to avoid the formation of separation regions 110, on the other hand.

Figure 5A:
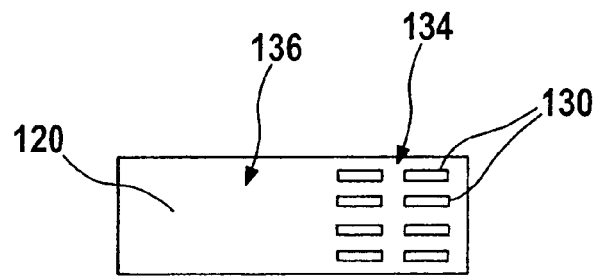
FIGS. 5A to 5C show alternative specific embodiments of perforated sheet metal baffles.
Figure 5B:
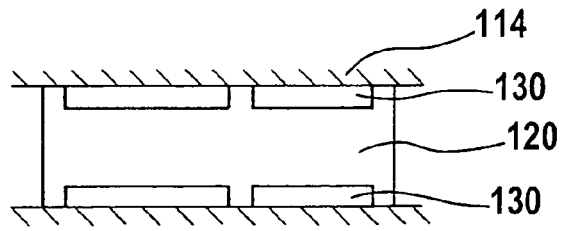
Figure 5C:
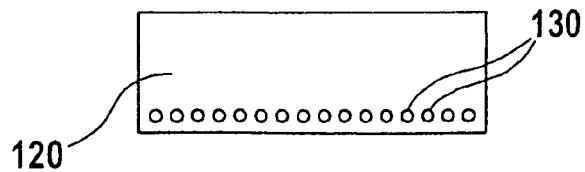

In FIGS. 5A to 5C, various examples of sheet metal baffles 120 are shown that are alternative to FIG. 4. Thus, FIG. 5A shows an arrangement in which, similarly to FIG. 4, in a first area 134, which is situated at the flow end, rectangular openings 130 are situated. These rectangles are formed in an extended manner, having a longer side along the main flow direction and a narrow side perpendicular to it. Again, to this first area 134 a second area 136 adjoins downstream, which is not perforated.

By contrast, in FIG. 5B an exemplary embodiment of a sheet metal baffle 120 is shown in which openings 130 are not situated in the middle of sheet metal guide 120, but at its edges. In this context, sheet metal baffle 120 is pictured in the state of being inserted into flow tube 114. Openings 130 are recesses in the form of rectangles in the edges of flow sheet metal baffle 120, in this instance.

In FIG. 5C, by contrast, openings 130 are developed as a row of holes, which extend along the lower edge of flow sheet metal baffle 120 along its longer edge.

The examples in FIGS. 5B and 5C show that the "density" of openings 130 is able to be varied not only, as in examples 4 and 5A, in the flow direction, but also perpendicular to this flow direction. In this way, for instance, using commercially available CFD simulation software (CFD=computational fluid dynamics), the design and distribution of openings 130 may easily be optimized in flow sheet metal baffles 120.

As was described above, the flow guide element may be used in technology in various ways, especially in the field of automotive technology. One example (not shown below) of such an application is the modification of the flow baffle (reference numeral 50) of German Patent Application No. DE 102 53 970, in such a way that it has additional openings 130.

Figure 6A:
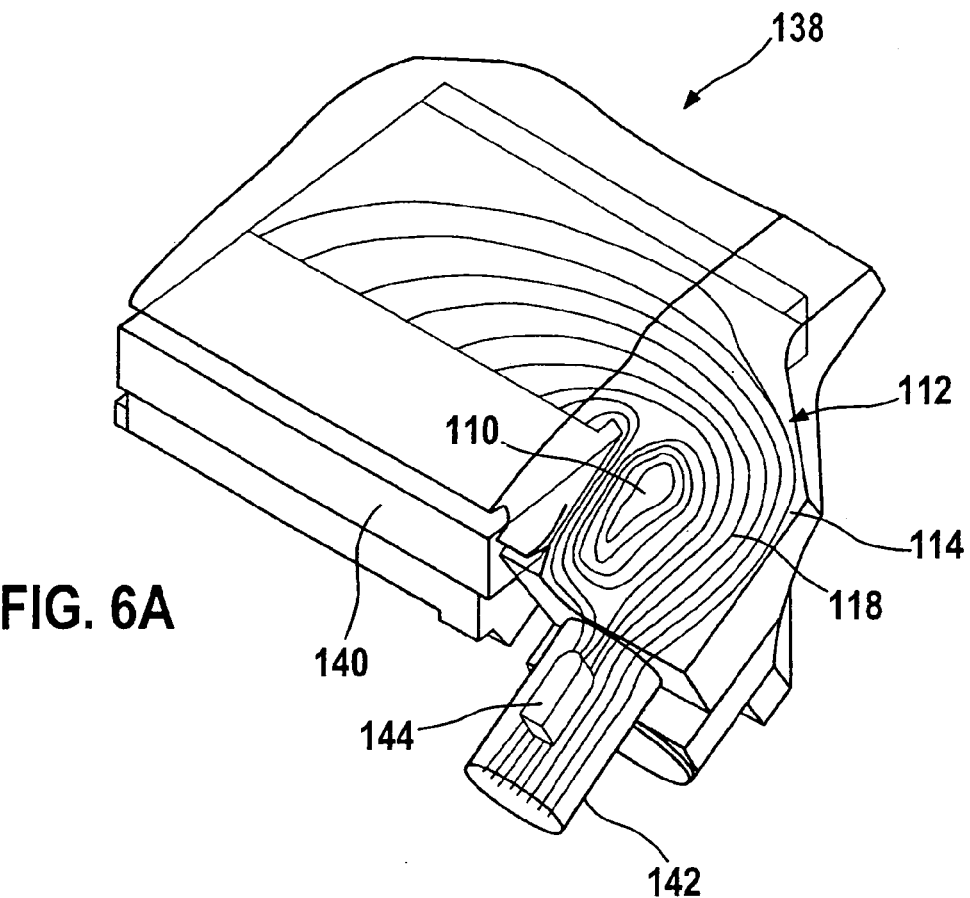
FIG. 6A shows a semitransparent, perspective representation of the flow in an elbow of an air filter.
Figure 6B:
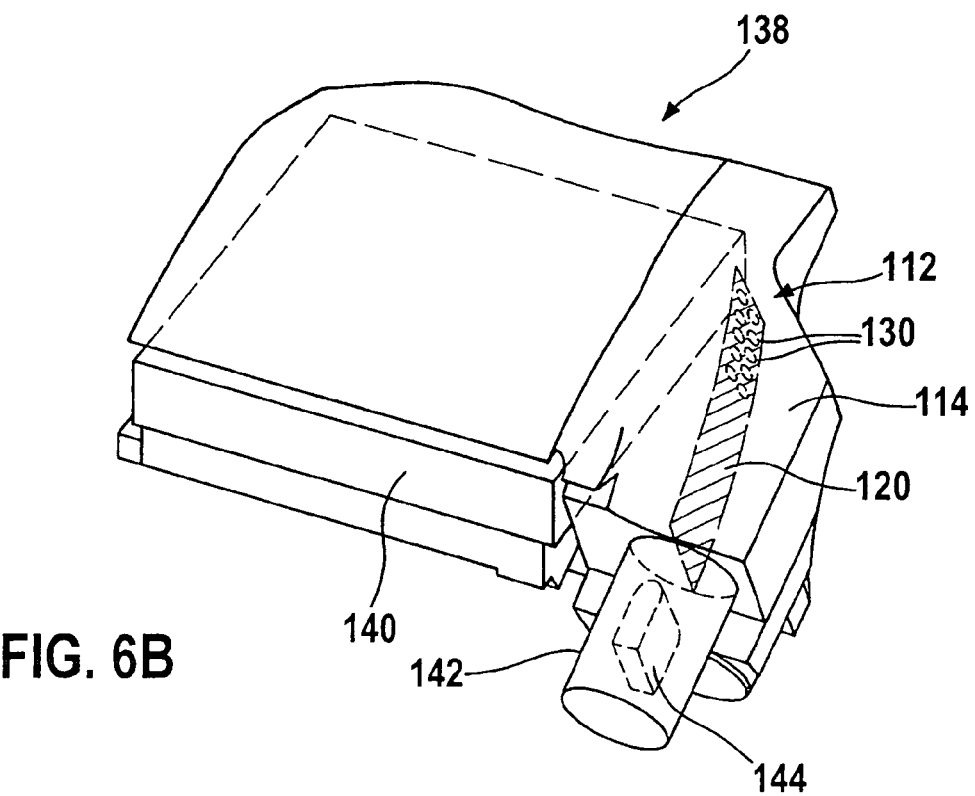
FIG. 6B shows the air filter according to FIG. 6A having a sheet metal baffle.

An additional example shown in FIGS. 6A and 6B is to design the air guidance in an air filter 138 appropriately. FIG. 6A, in this context, shows a half transparent, perspective representation of an usual air filter 138, flow lines 118 having been calculated using a CFD simulation in flow tube 114. FIG. 6B, on the other hand, shows an air filter 138 designed according to the present invention, in which a flow sheet metal baffle 120 having openings 130 has been inserted.

Air filter 138 has a filter unit 140, an adjoining flow tube 114 and a connection piece 142. In flow tube 114, directly ahead of connection piece 142, a hot-film air mass meter 144 is situated (which is abbreviated below as HFM).

From the representation of flow lines 118 in FIG. 6A one may see that in this design of air filter 138, in the region of elbow 112, or rather immediately after it, a large separation region 110 has been formed. This separation region 110 not only borders on the throughput, and thus on the entire intake air quantity, but also represents a source of unreliabilities of measurements of hot-film air mass meter 144, because of the direct spatial vicinity to HFM 144 and the usually occurring instabilities of separation region 110.

By contrast, in the design of air filter 138 according to FIG. 6B (shown only symbolically in FIG. 6B) a flow sheet metal baffle 120, according to the design shown in FIG. 4, is inserted into flow tube 114, in the area of elbow 112. Openings 130 are situated at the flow side, in this instance. As may be seen in FIG. 6B, flow sheet metal baffle 120, in this context, extends downstream up to the vicinity of hot-film air mass meter 144. By way of this flow sheet metal baffle 120, separation region 110 may be considerably diminished, and the flow quality may be considerably improved.

What is claimed is:

1. A flow guide element in an intake tract of an internal combustion engine for guiding the flow of a fluid medium, comprising:
    a flow tube having an elbow for diverting the flow, in a region of the elbow; and
    at least one flow baffle, the flow baffle situated in an air filter in the region of the elbow, the flow baffle having at least one deflector designed to favor the diversion of the flow, the deflector having an opening, passing through the flow baffle, in at least one area, the opening extending from a luff side of the flow baffle to a lee side of the flow baffle, thereby allowing for the flow of the fluid medium from the luff side to the lee side and for generating longitudinal swirls in the flow of the fluid medium on the lee side,
    wherein the flow guide element is situated between a filter unit of the air filter and a connection piece.

2. The flow guide element according to claim 1, wherein the flow baffle includes a sheet metal baffle.

3. The flow guide element according to claim 2, wherein the sheet metal baffle has a rectangular form.

4. The flow guide element according to claim 2, wherein the sheet metal baffle includes a perforated sheet metal.

5. The flow guide element according to claim 1, wherein the opening has at least one of the following shapes: a round shape, a circular shape, an oval shape, a multiangular shape, a rectangular shape, and a slot shape.

6. The flow guide element according to claim 1, wherein the deflector has a plurality of openings situated in matrix form.

7. The flow guide element according to claim 1, wherein the opening has a recess at an edge of the flow guide element.

8. The flow guide element according to claim 1, wherein the flow baffle includes at least one first area having openings, and at least one second area not having openings.

9. The flow guide element according to claim 1, wherein the flow guide element is situated between a filter unit of an air filter and a hot-film air mass meter.

10. The flow guide element according to claim 1, wherein the flow guide element is situated in a bypass channel of a hot-film air mass meter.

11. The flow guide element according to claim 4, wherein the sheet metal has a thickness of 0.7 mm and the opening has a diameter of 1 mm.

12. The flow guide element according to claim 8, wherein the baffle has its greatest curvature in the at least one first area.

13. The flow guide element according to claim 5, wherein the rectangular shaped opening has a longer side along a main flow direction and a narrower side perpendicular to the main flow direction.

14. The flow guide element according to claim 1, wherein the opening is situated at an upstream end of the at least one flow baffle and not at a downstream end of the at least one flow baffle.

* * * * *